US008166856B2

(12) United States Patent
Kim et al.

(10) Patent No.: US 8,166,856 B2
(45) **Date of Patent: *May 1, 2012**

(54) METHOD FOR PORTIONING FOODSTUFF TO USER-SPECIFIED SHAPE

(75) Inventors: Kwang S. Kim, University Place, WA (US); Stan Wijts, Redmond, WA (US); Norman A. Rudy, Snohomish, WA (US)

(73) Assignee: John Bean Technologies Corporation, Chicago, IL (US)

( * ) Notice: Subject to any disclaimer, the term of this patent is extended or adjusted under 35 U.S.C. 154(b) by 149 days.

This patent is subject to a terminal disclaimer.

(21) Appl. No.: 12/369,715

(22) Filed: Feb. 11, 2009

(65) Prior Publication Data

US 2009/0149986 A1 Jun. 11, 2009

Related U.S. Application Data

(62) Division of application No. 11/747,117, filed on May 10, 2007, now Pat. No. 8,025,000, which is a division of application No. 10/361,730, filed on Feb. 5, 2003, now Pat. No. 7,841,264, which is a division of application No. 09/619,424, filed on Jul. 19, 2000, now abandoned.

(51) Int. Cl.

| | |
|---|---|
| ***A22C 17/00*** | (2006.01) |
| ***B26D 1/01*** | (2006.01) |
| ***B26D 5/00*** | (2006.01) |
| ***B26D 7/27*** | (2006.01) |
| ***G01N 21/88*** | (2006.01) |

(52) U.S. Cl. ................. 83/13; 83/75.5; 83/177; 83/932; 452/156; 700/171

(58) Field of Classification Search ................... 83/75.5, 83/13, 53, 177, 932; 348/89; 345/423; 452/150, 452/155–157; 382/110; 700/28–31, 171, 700/173; 702/156

See application file for complete search history.

(56) References Cited

U.S. PATENT DOCUMENTS

| | | | |
|---|---|---|---|
| 1,278,537 | A | 9/1918 | Wegner |
| 1,465,959 | A | 8/1923 | Winter |
| 1,465,960 | A | 8/1923 | Winter |
| 3,236,128 | A | 2/1966 | Holden |
| 3,375,917 | A | 4/1968 | Irving, Jr. |

(Continued)

FOREIGN PATENT DOCUMENTS

| | | | |
|---|---|---|---|
| DE | G94156688.3 | U1 | 1/1995 |

(Continued)

*Primary Examiner* — Clark F. Dexter

(74) *Attorney, Agent, or Firm* — Christensen O'Connor Johnson Kindness PLLC

(57) ABSTRACT

A system for cutting a three-dimensional portion from a foodstuff. The system includes a scanner for scanning the foodstuff, a computer coupled to the scanner for receiving information from the scanner to determine one or more cutting paths for the foodstuff, and a cutter for portioning the foodstuff according to the one or more determined cutting paths. The computer is configured to perform generally four steps: (i) receiving scan information of the foodstuff from the scanner; (ii) building a three-dimensional map of the foodstuff based on the received scan information of the foodstuff; (iii) fitting at least one desired shape, which is stored in memory of the computer, onto the three-dimensional map in the memory of the computer; and (iv) determining one or more cutting paths to be used in portioning the foodstuff so as to produce one or more portioned foodstuffs corresponding to the at least one desired shape.

11 Claims, 5 Drawing Sheets

U.S. PATENT DOCUMENTS

| | | | | | |
|---|---|---|---|---|---|
| 3,495,492 | A | | 2/1970 | Gerber | |
| 3,757,926 | A | | 9/1973 | Gendron | |
| 3,835,747 | A | | 9/1974 | Bystron | |
| 3,850,088 | A | | 11/1974 | Tobey | |
| 3,877,334 | A | | 4/1975 | Gerber | |
| 4,077,291 | A | | 3/1978 | Obenshain | |
| 4,246,837 | A | | 1/1981 | Chenery | |
| 4,312,254 | A | | 1/1982 | Pearl | |
| 4,322,993 | A | | 4/1982 | Stumpf | |
| 4,423,671 | A | | 1/1984 | Murphy | |
| 4,442,657 | A | | 4/1984 | Busseniers | |
| 4,446,601 | A | | 5/1984 | Carruthers | |
| 4,452,113 | A | | 6/1984 | Pearl | |
| 4,476,756 | A | | 10/1984 | Pearl | |
| 4,557,019 | A | | 12/1985 | Van Devanter | |
| 4,646,911 | A | | 3/1987 | Pearl | |
| 4,656,904 | A | | 4/1987 | Rayment | |
| 4,662,029 | A | | 5/1987 | Helsene | |
| 4,726,094 | A | | 2/1988 | Braeger | |
| 4,730,526 | A | | 3/1988 | Pearl | |
| 4,748,724 | A | | 6/1988 | Lapeyre | |
| 4,875,254 | A | | 10/1989 | Rudy | |
| 4,962,568 | A | | 10/1990 | Rudy | |
| 5,054,345 | A | | 10/1991 | Weber | |
| 5,076,124 | A | | 12/1991 | Whitehouse | |
| RE33,851 | E | | 3/1992 | Rudy | |
| RE33,904 | E | | 4/1992 | Rudy | |
| 5,133,687 | A | * | 7/1992 | Malloy | 452/149 |
| 5,162,016 | A | | 11/1992 | Malloy | |
| 5,163,865 | A | | 11/1992 | Smith | |
| 5,184,733 | A | | 2/1993 | Arnarson | |
| 5,229,840 | A | | 7/1993 | Arnarson | |
| 5,230,267 | A | | 7/1993 | Abler | |
| 5,267,168 | A | | 11/1993 | Antonissen | |
| 5,271,304 | A | | 12/1993 | Wygal | |
| 5,324,228 | A | | 6/1994 | Vogeley, Jr. | |
| 5,352,153 | A | | 10/1994 | Burch | |
| 5,365,816 | A | | 11/1994 | Rudy | |
| 5,582,283 | A | | 12/1996 | Arnarson | |
| 5,585,603 | A | | 12/1996 | Vogeley, Jr. | |
| 5,662,949 | A | | 9/1997 | Rubio | |
| 5,668,634 | A | | 9/1997 | Newman | |
| 5,699,707 | A | | 12/1997 | Campbell, Jr. | |
| 5,793,879 | A | | 8/1998 | Benn | |
| 5,868,056 | A | | 2/1999 | Pfarr | |
| 5,871,078 | A | | 2/1999 | Arnarson | |
| 5,931,178 | A | | 8/1999 | Pfarr | |
| 5,937,080 | A | | 8/1999 | Vogeley, Jr. | |
| 5,988,862 | A | * | 11/1999 | Kacyra et al. | 703/6 |
| 6,032,561 | A | | 3/2000 | Lonn | |
| RE36,664 | E | | 4/2000 | O'Brien | |
| 6,164,174 | A | * | 12/2000 | Sigurdsson et al. | 83/13 |
| 6,330,523 | B1 | * | 12/2001 | Kacyra et al. | 702/159 |
| 6,443,160 | B1 | | 9/2002 | Boldrini | |
| 6,882,434 | B1 | * | 4/2005 | Sandberg et al. | 356/601 |

FOREIGN PATENT DOCUMENTS

| | | | |
|---|---|---|---|
| FR | 1576628 | A | 8/1969 |
| FR | 2623470 | A1 | 5/1989 |
| GB | 665652 | | 1/1952 |
| GB | 1444457 | | 7/1976 |
| GB | 2218615 | A | 11/1989 |
| GB | 2241683 | A | 9/1991 |
| GB | 2285126 | A | 6/1995 |
| WO | 8908983 | A1 | 10/1989 |
| WO | 9731760 | A1 | 9/1997 |
| WO | 9835797 | A1 | 8/1998 |

* cited by examiner

METHOD FOR PORTIONING FOODSTUFF TO USER-SPECIFIED SHAPE

CROSS-REFERENCE TO RELATED APPLICATIONS

This application is a division of application Ser. No. 11/747,117, filed May 10, 2007, now U.S. Pat No. 8,025,000 which is a division of application Ser. No. 10/361,730, filed Feb. 5, 2003, now U.S. Pat No. 7,841,264 which is a division of application Ser. No. 09/619,424, filed Jul. 19, 2000, now abandoned, the disclosures of which are incorporated herein by reference in their entirety.

FIELD OF THE INVENTION

This invention pertains to methods for portioning foodstuff, and more particularly, for portioning a foodstuff in accordance with a predetermined shape by building a three-dimensional map of the foodstuff and then cutting the foodstuff in three dimensions.

BACKGROUND OF THE INVENTION

The slaughterhouse industries have traditionally been labor intensive; however, as in other labor intensive segments of industry, attempts are being made to reduce manual labor, increase speed, and improve productivity. A particularly labor intensive task is the portioning of foodstuffs such as meats from beef, poultry or fish. An important goal in food portioning is consistency. For instance, restaurants want to serve portions that will not differ markedly from day to day in size, quality, fat content and/or other criteria. In order to meet minimum weight specifications, a food portion often has to exceed the acceptable minimum weight. This is because restaurants must take into account some of the variation that can exist between portions. In order to assure that all portions meet minimum specifications, it is usually necessary to use a target weight that is somewhat above the minimum. This may be a bonus to consumers but a problem for restaurateurs and others who may end up giving away a significant portion of their profit margin. By having consistent portions, restaurateurs can reduce the amount of excess that is built into the portions they serve, and consumers are more likely to receive the same quantity and quality of meat product.

Up until now, skilled workers usually bore the responsibility of cutting foodstuffs into constant weight or constant sized portions. These methods can and often do result in waste. Workers, in theory, can manually portion meat to about the same size of portions. However, workers, unlike machines, fatigue and the constant repetitive motion involved with butchering may lead to disabling injuries.

Therefore, the industry is aware of the need to increase the productivity of its work, without unduly burdening its workers. Several inventors have sought to devise ways to equally portion meats utilizing automated machinery to reduce manual labor. Therefore, methods and machines have been designed in an attempt to automatically cut food so that portions are of approximately equal weight.

One approach to introduce automation into the food portioning industry is to measure the cross sectional area of the foodstuff and assume that such area remains constant throughout the length of foodstuff. As the conveyer moves forward, a transverse cutting device is activated at equally spaced predetermined time intervals. This method achieves portions of equal thickness, but not necessarily equal weight, as the cross-sectional profile of each succeeding cut can be smaller or larger than the previous one. In order to achieve substantial equal weight portions, this method requires that a human operator trim the foodstuff so that it essentially conforms to a uniform cross-section along the longitudinal axis. Once this step is performed, the machine may proceed cutting at predetermined lengths. This method could lead to a large amount of waste, and inconsistent weight portions.

An improvement over the above method can take into account the cross-sectional area after each cut is made. From this measurement and the assumed density of the foodstuff, the thickness to achieve a desired weight can be calculated by integrating the cross sectional area over the length until the desired weight is reached. As the conveyor advances, its forward progress is monitored and the foodstuff is trimmed in a transverse manner at the point when the thickness corresponds to the calculated thickness. This process is repeated until the whole foodstuff, for example, a primal cut of beef, or a fish is portioned into individualized, nearly equal weight portions. However, this method does not account for indentations, significant contours, or tissue discontinuities appearing throughout the foodstuff, which can often affect the density. Further, these methods do not contemplate cutting in three dimensions, meaning that usually one dimension is always fixed, as happens with chicken breasts or a primal cut of beef. Chicken breasts may be portioned along the length and width, and a primal cut of beef, such as a loin, is cut lengthwise.

Other automated methods are aimed at producing food portions which trim fat to produce portions with acceptable quantities of lean meat in relation to fat. Again, with these methods, portioning is done in two dimensions. As with previous methods, the initial portioning is done by human operators to carve the initial starting block and only then, can the machine proceed. These methods can rely on a scanning apparatus to determine where the demarcations between fat, bone, or cartilage and meat lie. Scanning apparatus require light or X-ray radiation to detect the fat regions. After this determination is made, a machine can trim the fat from the lean tissue. Once the fat is removed, the resultant food portion is weighed and sorted. These methods are “after the fact,” since the weight or size of the individual food portions is not considered in determining the appropriate amount of portioning. The portions are simply sorted according to weight after the trimming operation is complete.

In a variant of a previous method, other methods of portioning involve scanning the foodstuff to determine the thickness of the foodstuff passing directly underneath the scanner. From the scan, a computer will be able to mark the cutting line at which to cut to achieve the predetermined weight or size. The cutting apparatus can move while the foodstuff also moves on the conveyor, or the conveyor may stop at a cutting station and allow the cutting apparatus to cut the portion. These methods are limited in that the only cut that can be made is in the transverse direction. Using this method, one is also limited to a foodstuff portion having the initial thickness.

Other methods are directed at ways of classifying meats to determine which cut will maximize profit, i.e., which cut of meat is selling at the highest price per pound at the current time. A computer may be used to calculate and determine a portioning strategy to maximize the amount of those portions which are selling at the highest price. These methods lack the capability to generate a three-dimensional map and are concerned only with making primal cuts of meat.

Other methods are directed at increasing the speed of the cutting devices, or perhaps cutting the foodstuff in two directions. However, these methods, as with the methods previously mentioned, assume that the foodstuff is fixed in one dimension, most commonly the thickness dimension. This may be unacceptable for a variety of reasons. Heretofore, attempts have not been made to portion foodstuffs automatically along a third dimension to arrive at the desired shape or weight. Portions of meat, particularly chicken breasts, have now increased in size so greatly that two-directional cuts simply are no longer suitable to trim the breasts down to desired portions.

Therefore, to date no method or apparatus has been devised that will build an accurate three-dimensional map of the foodstuff, including the indentations and contours, that is to be portioned, then compare the map to a predetermined form, and then through the use of a computer controlled system automatically cut the foodstuff in three dimensions so as to achieve the predetermined shape or weight. The method of the present invention seeks to accomplish this task. The present invention will further increase productivity in the methods for portioning foodstuffs, particularly those meats, such as beef, poultry or fish which have uneven surfaces, including indentations and contours, to achieve consistent portions.

SUMMARY OF THE INVENTION

The present invention discloses a method for portioning foodstuffs in three dimensions. A step in portioning according to the present invention includes scanning the foodstuff to be portioned. Followed by a step of generating a three-dimensional map of the foodstuff. Then, comparing the generated three-dimensional map of the foodstuff with the desired shape which is stored in the memory of a computer. The computer will then be able to determine the particular cutting path in three dimensions in order to arrive at the predetermined shape or weight. After comparison of the generated map against the map stored in the computer memory, there follows a step of cutting in one direction to fix at least one dimension of the foodstuff. This is followed by a step of determining whether the foodstuff is within the tolerance limits to proceed with another cutting step or whether the foodstuff portion has moved during the first cutting step. If the foodstuff portion has moved, the foodstuff will be scanned in a second scanning step and a second map of the foodstuff will be generated. Optionally, the scan may only include a map in two dimensions since one dimension has been fixed. Thereafter follows a step of determining the cutting path to cut the foodstuff along two dimensions to arrive at a portion that has been trimmed along three dimensions.

A preferred embodiment of a method according to the present invention will include a step to scan the foodstuff to be portioned. Several apparatus are in existence which are suitable for this purpose. The preferred apparatus can use light or X-ray radiation. The radiation is attenuated or otherwise modified as it strikes the foodstuff or passes through the foodstuff in a predictable manner so that a relationship is formed between the attenuation and a physical parameter of the foodstuff. The scanner also includes a receiver portion, capable of receiving the radiation after being attenuated or modified by the foodstuff and capable of converting it into electrical signals which vary as a function of the physical parameter of the foodstuff. The signals are processed to represent a three-dimensional map which accurately depicts the foodstuff in all details including the indentations, contours and discontinuities. Preferably, this step is carried out by a computer, having a CPU and a memory, capable of analyzing the signals sent by the receiver portion of the scanner. Once having created a three-dimensional map, a step of comparing the three-dimensional map with a map of a desired shape of the foodstuff follows. Preferably, this step is also carried out by a computer wherein the desired shape is stored in the memory of the computer. The CPU then executes a predetermined algorithm to fit the desired shape within the generated map. Having established a fit, the cutting path is marked in three dimensions. Thereafter, the foodstuff can be cut in at least one dimension to fix that one dimension, for example the thickness. The cutting device is directed by the computer according to the cutting path. Preferably, the cutting device is a high pressure water jet. After the first cutting step, a determination is made whether the foodstuff is within tolerance limits to proceed to a second cutting step. During the first cutting step, the foodstuff may have moved, thereby rendering the three-dimensional map created in a previous step no longer accurate. The computer is required to know the position of the foodstuff to accurately cut the foodstuff to the desired shape. Therefore, there are limits placed on the amount of movement that can be tolerated during the first cutting step. If the tolerance limits have not been exceeded, the computer will direct the path of the next cutting step. Otherwise, a step follows wherein the foodstuff is scanned and preferably a two-dimensional map is generated, preferably, by devices similar to the devices used in generating a three-dimensional map. The newly generated map is again compared with the desired shape of the foodstuff. Preferably, this step is carried out by a computer wherein the desired shape is stored in a computer memory. The CPU may then execute a predetermined algorithm using any of a number of variables, such as the length, width or thickness, for determining a cutting path. Thereafter follows a step of cutting the foodstuff in at least one dimension to fix that dimension, or two dimensions, for example, the foodstuff may be cut a predetermined length and width, the thickness having already been fixed by a previous step. Therefore, the present invention achieves a desired shape from a foodstuff portioned along three dimensions. This is desirable when, for example, the original foodstuff portion is too big for an intended product.

Another embodiment of the present invention further includes a step of fitting several desired shapes into the generated map of the foodstuff, thereby maximizing the amount of foodstuff that is cut into desired shapes and minimizing the wasting of trailing portions.

A further embodiment of the present invention includes a product cut from a foodstuff using a method in accordance with the present invention. The foodstuff is cut and portioned along three dimensions including the thickness, width and length in two cutting steps.

A further embodiment of the present invention includes a product cut from a foodstuff using a method in accordance with the present invention. The desired final product has a substantially constant thickness, but the foodstuff has an arcuate shape. The foodstuff is cut and portioned along three dimensions including the thickness, width and length in two cutting steps. The product is cut from a foodstuff portion having an indentation. The cutting path used to cut the product is arcuate shaped to cut around the indentation in the foodstuff portion.

A further embodiment of the present invention includes a product cut from a foodstuff portion using a method in accordance with the present invention. The final product has a substantially constant thickness. The foodstuff is cut and portioned along three dimensions including the thickness, width and length in two cutting steps. The product is cut from a foodstuff having an undesirable constituent such as bone, cartilage or fat. The cutting path used to cut the product is skewed or at an angle.

A further embodiment of the present invention includes a plurality of final products cut from a foodstuff using a method in accordance with the present invention. The foodstuff is cut and portioned along three dimensions including the thickness, width and length in two cutting steps. The cutting paths can include multiple pass cuts through the foodstuff while partially controlling the depth of cutting. A plurality of products may be formed from a single foodstuff portion.

An advantage of a portioning method in accordance with the present invention is the elimination of manual labor to perform an initial slicing operation to fix one dimension of a portion of a foodstuff portion. Elimination of manual labor increases the productivity of the butchering industry.

A further advantage of a portioning method in accordance with the present invention is the savings incurred from optimizing a desired cut of meat product.

A further advantage of a portioning method in accordance with the present invention is the capability of cutting irregular shaped foodstuff portions having indentations or undesirable constituents.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
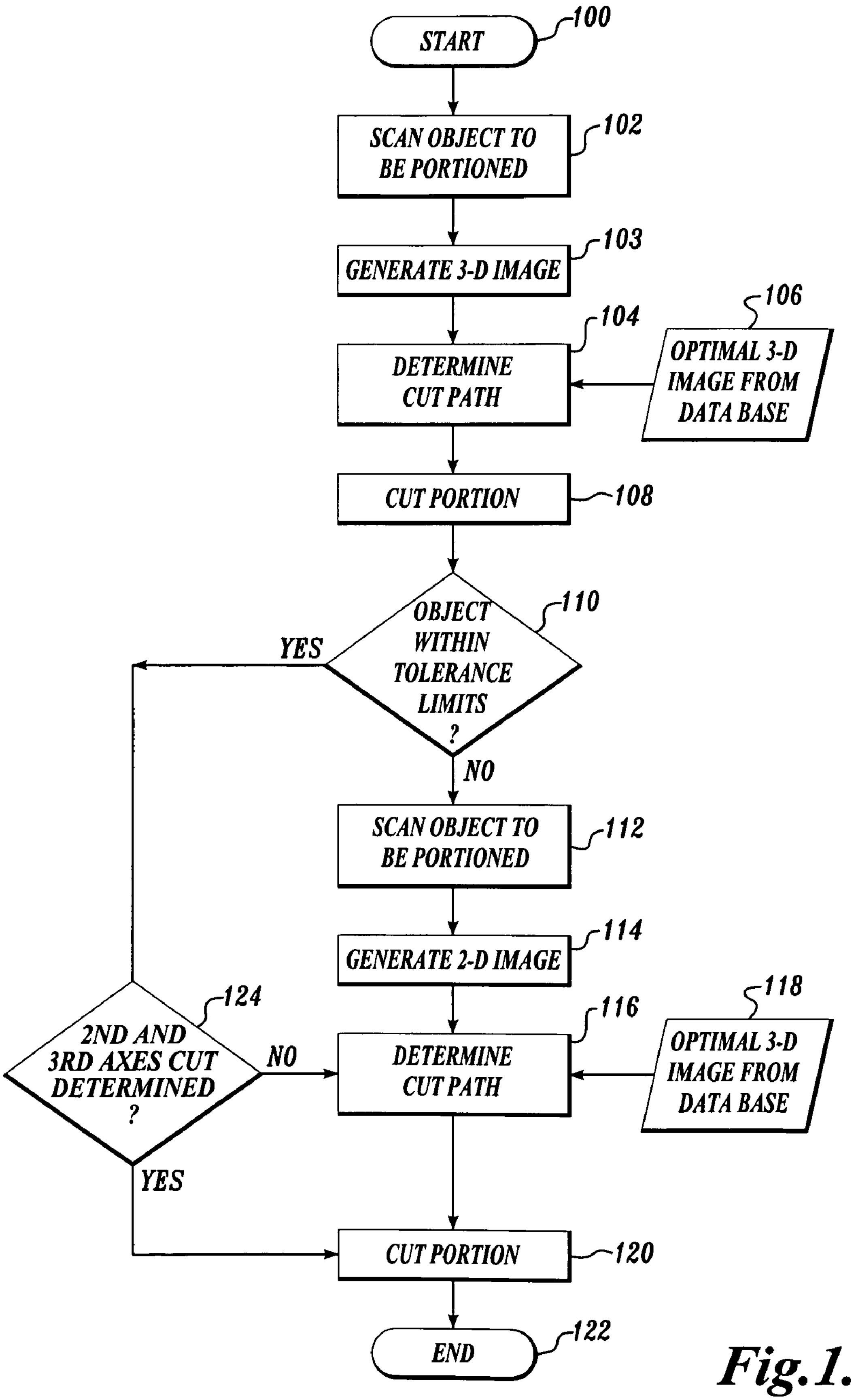
FIG. 1 shows a flow diagram of the steps in an embodiment of a method in accordance with the present invention.

A preferred embodiment of a method for portioning foodstuffs in accordance with the present invention is shown in FIG. 1. The method starts at 100 and includes the step 102 of scanning the foodstuff to be portioned. Next is the step 103 of generating a three-dimensional map of the foodstuff. Input 106 depicting a form of a predetermined shape is compared with the map, and a cutting path is determined in step 104 comparing the generated three-dimensional map of the foodstuff with one or more desired shapes which are stored in the memory of a computer. Next is a step 108 of cutting the foodstuff in one direction to fix at least one dimension of the foodstuff. Next is a decision-making step 110 of determining whether the foodstuff is within the tolerance limits or whether the foodstuff portion has moved during the first cutting step 108. If the foodstuff portion has moved during the cutting step 108, the foodstuff will be rescanned in step 112 and in step 114, a two-dimensional image of the foodstuff will be generated. If the foodstuff portion has not moved, a second decision-making step 124 will ask whether the second cut path in two axes has also been determined. If the second cut path has been determined in an earlier step, such as step 104, the foodstuff will be portioned along a second and third axis. Otherwise, input 118 is received and a second cutting path is determined in step 116. Thereafter follows a step 120 of cutting the foodstuff and the end 122 of the method.

Figure 2:
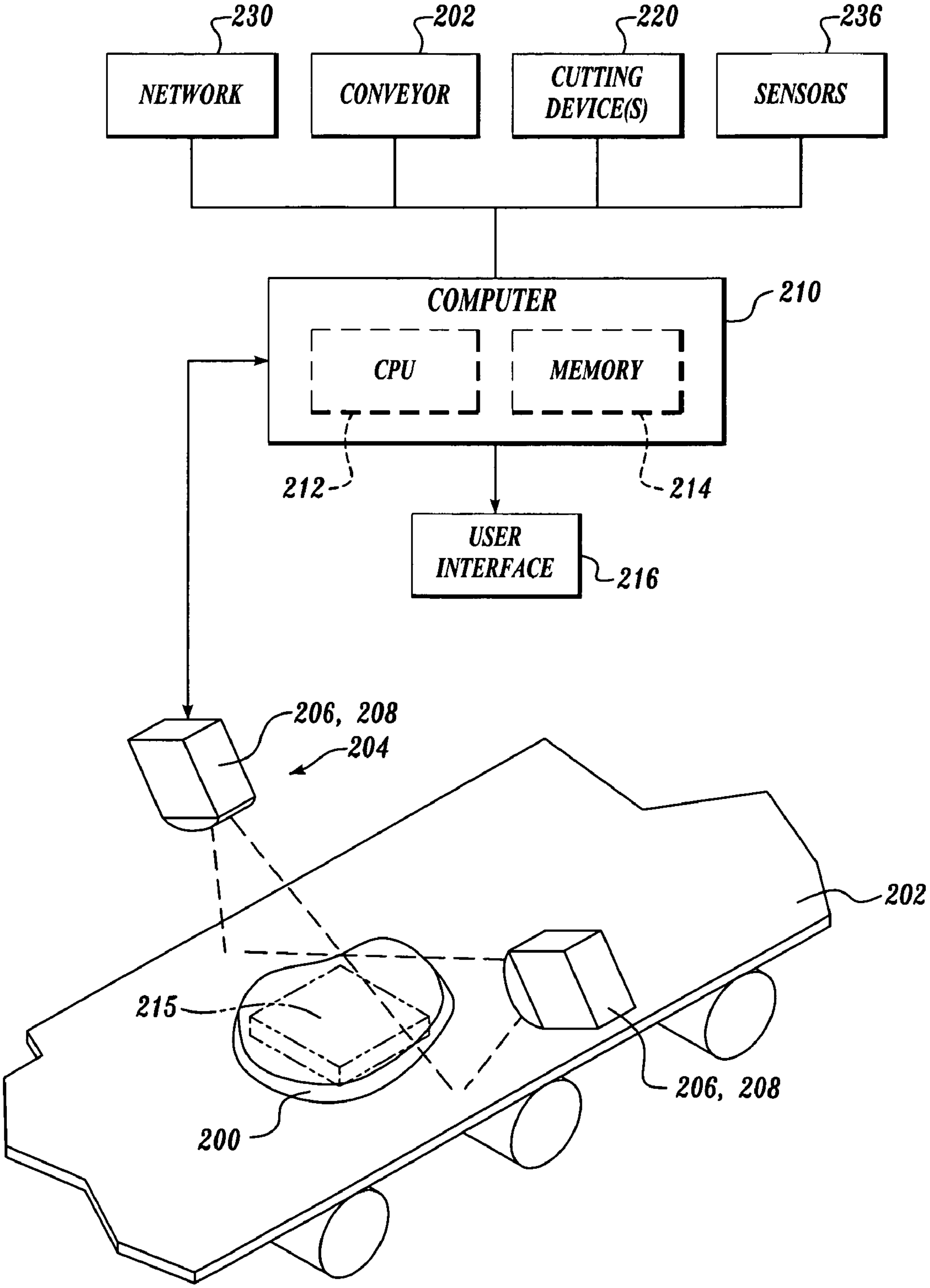
FIG. 2 shows physical embodiments to perform the steps of the method of FIG. 1.

Referring to FIG. 2, in a preferred embodiment of a method according to the present invention, the foodstuff portion 200 will travel on an endless conveyor system including endless conveyor belt 202. An initial step in a method of portioning foodstuff in accordance with the present invention is scanning the foodstuff to be portioned as shown in FIG. 1. Any number of foodstuffs desired to be portioned may be loaded onto the moving endless conveyor system. The conveyor is suited to carry the foodstuff along a processing line where it may be processed by the various apparatus used to carry out the steps of the present invention.

The conveyor belt 202 carries the foodstuff 200 underneath a first scanner system, generally denoted by 204. The scanner system 204 suitable for use in this method will have the ability to generate a three-dimensional map of the foodstuffs. The principle behind the scanner system is the use of radiation, which forms a relationship with a physical parameter of the foodstuff which is being scanned. Any one of several devices are suitable for this method. Several devices in use today employ X-rays or visible light to generate an image of the foodstuff. A scanner according to the present invention will include both a generator 206 to irradiate the foodstuff to be scanned with radiation and a receiver 208 to receive the attenuated radiation. The receiver portion 208 can be integral with the generator 206. Radiation may be electromagnetic radiation throughout the spectrum from high frequency radiation, such as X-rays, to relatively low frequency natural spectrum light.

A scanner can also include the receiver 208 to receive and detect the amount of radiation attenuated by an object. Attenuation can occur by passing through the object or by reflection from the object. When radiation passes through a foodstuff, a certain amount of radiation is absorbed by the foodstuff through which it passes, therefore there will be a relationship in the amount between the radiation sent to the foodstuff and the radiation received after it has passed through the foodstuff. The cause of absorption is believed to reside in the chemical bonds within the molecules of the foodstuff. Radiation once attenuated can be collected, and converted into a useable form. Photodiodes, for example, may be used to convert an amount of radiation in the visible range into a voltage or current signal. For X-rays, a scintillating material may be used to generate visible light capable of detection by a photodiode. This method is described in U.S. Pat. No. 5,585,603, issued to Vogeley, Jr., which is herein incorporated by reference. Other methods teach the use of a video camera to determine the size and/or shape of a foodstuff. These methods and apparatus are described in Reissue Pat. Nos. 33,851 and 33,904, issued to Rudy et al., which are herein incorporated by reference.

The signals generated by photodiodes can then be further processed by a computer to determine a physical quantity which is related to the amount of radiation which is detected. One such quantity may be the mass of the foodstuff. Since the scanner will presumably know the amount of radiation that was sent to the foodstuff and the amount of radiation that was received, the amount absorbed forms a difference which is a direct relationship of the mass of the foodstuff. Once knowing the mass, volume of the incremental scanned area is calculated by assuming a density. The thickness can be derived once knowing the linear dimensions of the volume.

Any one of the above-described devices currently in use today will be suitable for use in a method in accordance with the present invention. Still, other methods of three-dimensional imaging may use reflective means rather than absorptive means. For example, a receiver may measure the amount of light reflected from a foodstuff rather than the amount of radiation passing through the foodstuff. The areas of foodstuff tissue are distinguishable from areas, such as the conveyor, which surround the foodstuff and have a different reflective index. These differences can be used to determine the shape of a foodstuff. A person of ordinary skill in the art will have knowledge of suitable devices of carrying out this step in accordance with the present invention.

Using a selected method, the scanner may repeat the process in quick succeeding intervals corresponding to one incremental dimensional unit such as by advancing the conveyor, or the scanner may execute a strobe-like effect, or the scanning process may be essentially continuous, with the map being formed as the foodstuff is continually advanced underneath the scanner. The imaging process can be integrated over an entire length of foodstuff to arrive at a three-dimensional map of the foodstuff. The three-dimensional map generated by the computer will have coordinates to fixed points or locations to enable other apparatus to reference these points and trim or portion the foodstuff with reference to these fixed points accurately. Other devices for identifying fat or bony cartilaginous matter and skin may also be incorporated and adapted to the present invention. These methods are also within the scope of this invention.

Step 103 of FIG. 1 includes generating a three-dimensional map of the foodstuff from signals sent via the scanner system as described above, preferably by the use of a computer 210, as shown in FIG. 2. The computer will be capable of performing executable steps wherein the signals received by the scanner are processed by the computer to produce a three-dimensional map, perhaps the map being discrete volume elements which as a whole create the three-dimensional map. The step of generating the three-dimensional map will be followed by comparing the generated map with one or more stored maps of a desired foodstuff shape in step 104 of FIG. 1.

Preferably, a computer 210 having a central processing unit 212 (hereinafter CPU) and a memory 214 will be used in the method according to the present invention. Input 106 of FIG. 1 of a desired shape is stored on computer memory 214. The memory can store additional maps that can readily be selected by a user via a user interface 216 when changing product lines. For instance, the user may be processing chicken breasts for a particular customer who may have a particular desired shape, when the order of the customer is filled; the user may switch the mode of the computer to a different product to meet the specifications of a different customer. This switch may be automated, and triggered by a counter that keeps track of the number of foodstuff portions that have been processed or it may be carried out manually to allow the user time to retool any apparatus or recalibrate. In other alternate embodiments of a method according to the present invention, a library of maps for a whole production plan can be stored in the memory of a computer.

In still other alternate embodiments, the computer 210 can be in communication with a network system 230 which allows the computer 210 to talk and share information with other computers. Computer 210 can also drive other periphery hardware besides the scanner system 204. For instance, computer 210 can direct the operation of the conveyor 202, or cutting devices, generally denoted as 220. Finally, computer 210 can receive information from various sensors 236 to guide or direct a multitude of systems.

In the preferred embodiment of the method of the present invention, the CPU 212 will retrieve the stored map(s), compare the stored map(s) with the generated map, and determine the path of the first cutting step 108 of FIG. 1. The CPU will be capable of executing an algorithm wherein the algorithm has a step to select a dimensional unit for comparison. The unit may be along any linear dimension or it may be a combination of linear dimensions. For example, in the preferred embodiment, thickness may be selected as the first unit of dimension to compare. If the generated map of the foodstuff is within the thickness specification of the desired shape, the computer may proceed to a further step wherein a further comparison of a different dimension is made, these comparisons may continue until it is determined that the desired shape will fit within the generated map of the foodstuff. FIG. 2 shows the foodstuff portion 200 having a desired shaped 215 fit within the dimension of the foodstuff. Thus, the computer will be able to generate one or more cutting paths to arrive at the desired shape 215 by trimming the foodstuff portion 200.

In an alternate embodiment, a first comparison and determination of a first unit dimension is made, if the foodstuff is within specifications of one unit dimension of the desired shape, the computer may direct the cutting devices to proceed to cut the food stuff along the predetermined cutting path to arrive at fixing one dimension. In this embodiment, having fixed one dimension, the computer can now proceed to make comparisons in the remaining dimensions and cut to those dimensions accordingly in later cutting steps.

In another alternate embodiment, all comparisons are completed before cutting begins, and following a step for comparing a dimensional unit, the computer may proceed to compare the foodstuff along a second dimensional unit. For example, in a preferred embodiment, the first dimensional unit for comparison is the thickness, followed by width and then the length. However, it should be realized that dimensional comparison may proceed in any order and in any combination. Embodiments of a method in accordance with the present invention contemplates these combinations and are within the scope of this invention. The width of the desired shape being then compared to the width of the generated map. If the width of the desired shape can fit within the width of the generated shape, the computer may proceed to compare the foodstuff along a third dimensional unit. For example, if the generated map has so far met the specification for thickness and width, the computer may analyze or compare for length. In this step, the computer will compare the length of the generated map to the desired shape, once the two other parameters have been established. The computer can manipulate the three dimensions individually or in combination trying to find the best fit for the desired shape into the generated map. The computer may even skew or rotate the desired shape within the generated map to avoid defects or abnormalities in the foodstuff or may adjust one dimension only. The computer may also base the best fit algorithm on other considerations. For example, mass rather than size may be the determining factor. To adjust for mass, the computer will have to set two dimensions and vary the third to arrive at the desired mass or any combination of dimensions. It should also be pointed out that comparisons of dimensional units may proceed on an incremental basis, such that the sum of all increments may produce a rounded or otherwise non-linear cutting path.

In determining the optimal cutting path, the computer may avoid indentations or undesired constituents such as bone or fat in the generated map to avoid having these constituents in the finished product. The devices for determining bone or fat tissue can be incorporated into the present invention for this purpose. Other embodiments may have the computer cut out or around the indentations or undesired constituents.

In still other embodiments, the desired shaped may be optimized, for instance, if longer portions are more valuable than shorter portions, yet both are acceptable to the customer, the computer may adjust the length in order to maximize the length. Other units and dimensions may be selected by the computer or the user in order to maximize the value of the foodstuff portion. Dimensional units which may be used by a computer in comparison, determination and optimization step(s) include units such as length, thickness, width, or weight.

Figure 3:
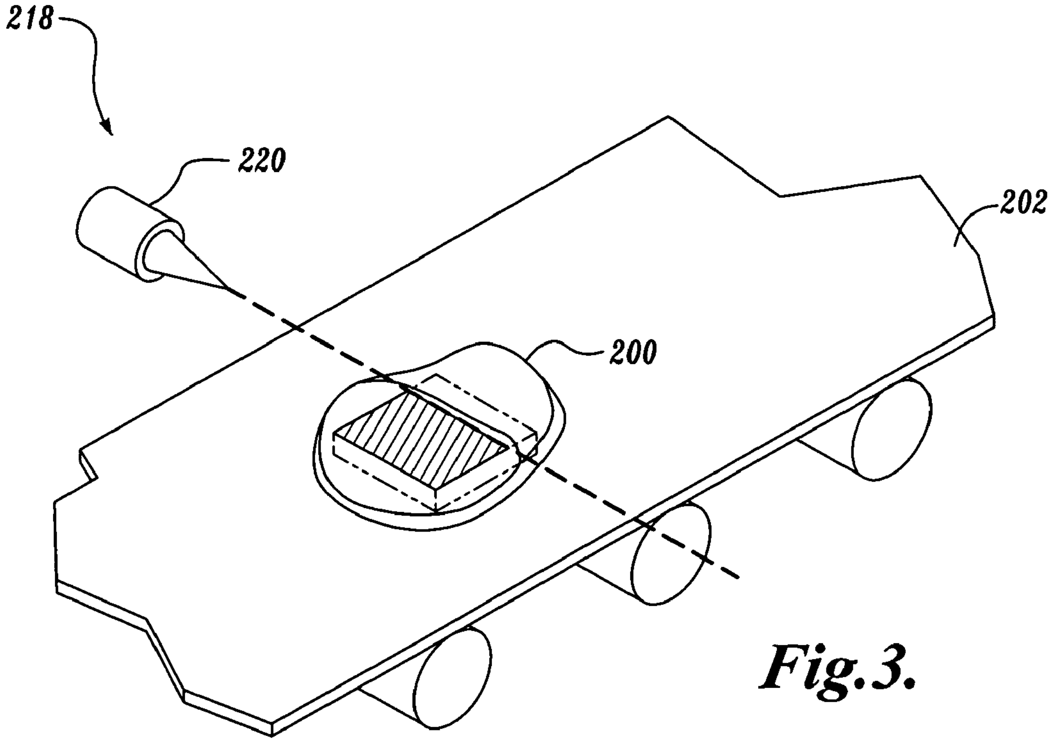
FIG. 3 shows physical embodiments to perform the steps of the method of FIG. 1.

In a preferred embodiment of the method of the present invention, a cutting step 108 will follow the comparison step 104 in FIG. 1. As the foodstuff portion 200 travels on a conveyor system, the conveyor 202 will have brought the foodstuff portion to a cutting station 218 as shown in FIG. 3. A cutting device 220 will be controlled by the computer 210 with the appropriate cutting path determined in an earlier step. Preferably, the cutting device in a method according to the present invention will use a band knife or an oscillating knife if the cut to be made is a long cut, but a high pressure water jet may also be used as well, to cut the foodstuff in accordance with the directions from the computer. Such cutting devices are described in U.S. Pat. No. 5,931,178, issued to Pfarr, which is herein incorporated by reference. Bandsaws and blades are described in U.S. Pat. No. 5,937,080, issued to Vogeley, Jr. et al., which is herein also incorporated by reference. However, other cutting devices, such as high pressure gas or lasers, that are well known in the art may also be used.

A suitable cutting device in accordance with the present invention will be capable of cutting along one axis, preferably horizontally as shown in FIG. 3, to establish a one-dimensional unit as described above. The water jet nozzle or other cutting device can be mounted on an articulating arm, such that the cutting jet may be directed at an angle or moved bi-directionally in single or multiple planes. Also, multiple cutting jets may be used together. As mentioned earlier, the computer may move the desired shape in a skewed manner to make the desired shape fit within the generated map or the computer may direct a cut be made in an arcuate or rounded configuration. The computer can also determine a cutting path to cut around bone, fat, cartilage or skin. If the desired shape is to be cut at an angle or in an arcuate fashion, a water jet may be one of the most effective ways of accomplishing this task. However, rotating or oscillating mechanical cutters using metal blades may also be used.

Alternatively, the water jet or other cutting device may make one or more passes to cut the desired thickness, or the water jet may cut from both directions. The cutting device may be mounted on a fixed platform or structure and the conveyer speed may determine the rate of portioning. Alternatively, the cutting device may be carried on a movable track system such as is disclosed in U.S. Pat. No. 5,868,056, issued to Pfarr et al., which is herein incorporated by reference. In a movable track system, the cutting tool may move at a speed faster than the conveyor, thereby enabling more complicated and multiple pass cuts. Cutting devices may also be controlled to achieve a predetermined depth, for example when portioning a foodstuff into several products, the cutting device will need to control the depth of a cut to be able to make several portions from a single larger portion. Any leftover portions may be retained and used for other applications or processed further or discarded.

In a preferred embodiment of the method of the present invention, determining whether the foodstuff portion has shifted from the fixed reference points is performed following the first cutting step in step 110 at FIG. 1. This step will determine whether the foodstuff portion occupies the same spatial relationship after the first cutting step. Of course, after having gone through a first cutting step, the foodstuff may have been reduced in volume. Therefore, what is being determined is whether the desired portion as defined by the computer has shifted or otherwise moved from its initial position. This is preferable to assuming the foodstuff portion has not moved and further processing the foodstuff portion under this assumption, resulting in an ultimate rejection or rework because the foodstuff portion had in fact moved.

Figure 4:
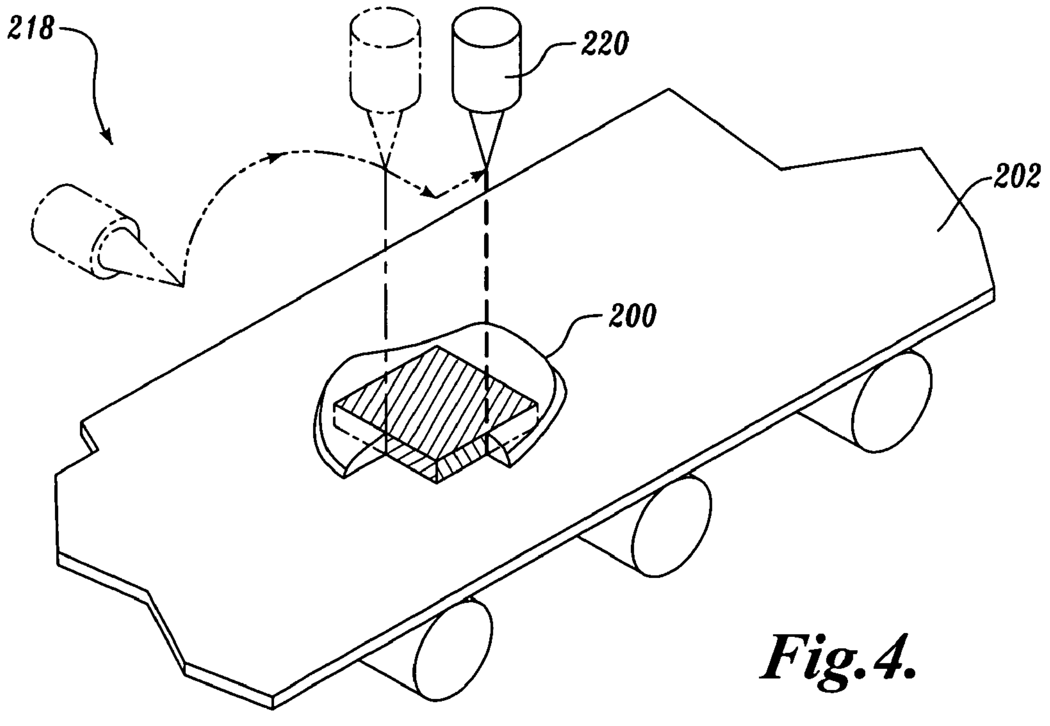
FIG. 4 shows physical embodiments to perform the steps of the method of FIG. 1.
Figure 5:
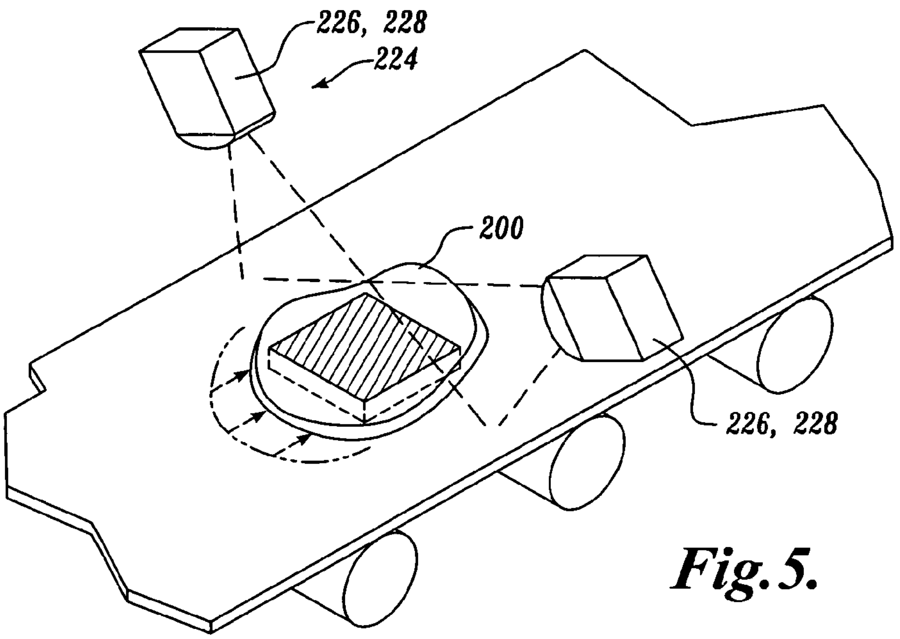
FIG. 5 shows physical embodiments to perform the steps of the method of FIG. 1.

FIG. 5 shows a second scanner system 224 for determining whether the foodstuff portion has shifted. The second scanner system may include such apparatus as an optical scanner, video camera, limit switches or other like apparatus for detection of out of bounds movement or motion. A person of ordinary skill in the art may readily appreciate any of a number of apparatus suitable for performing this step. In step 110, if the foodstuff is found not to have moved outside of the tolerance limits, the method according to the present invention will go to another decision step 124 which will determine the need to calculate the second cutting path. It may be that the second cutting path has been determined earlier in step 104, or in the alternate embodiment where only one dimension is determined and cut in the first cutting step, it will become necessary to jump forward to a second step 116 where the computer determines the second cutting path. Otherwise, from step 110 the method will jump directly to the cut portion step 120 of FIG. 1. In step 120, the computer directs a cutting device for cutting the foodstuff in a second or third dimensional unit, such as is described above. The second cutting step 120 is represented in FIG. 4. FIG. 4 shows the same cutting device utilized in an earlier step to portion the foodstuff 200 in one or more axes. FIG. 4 shows how the cutting device 220 can trim the foodstuff 200 to arrive at a second dimension, such as length, and a third dimension, such as width, to arrive at a foodstuff which has been portioned in three dimensions by one or more cutting devices. Alternatively, multiple cutting devices may be used to cut along one or more dimensions where the first cutting device is a different station than the second cutting station. For example, the first cut can be performed by a band saw or an oscillating blade and the second cut can be made by a high pressure water jet.

If the device used to detect shifting of the foodstuff signals that the foodstuff has moved from its initial position, the foodstuff portion may be rescanned in a second rescan step 112 as shown in FIG. 1 (if step 110 utilizes a scanner, step 112 can utilize the same scanner to scan the foodstuff a second time).

In a preferred embodiment of a method in accordance with the present invention, rescanning the foodstuff may take place with similar equipment that was described for the earlier scanning step 102. FIG. 5 shows the second scanner system 224 that will likewise include a generator portion 226 and a receiver portion 228, which may be integral or separate devices, to be able to generate a three-dimensional map of the foodstuff 200 to compare to the map stored in the computer.

Step 114 uses a computer to generate another map of the foodstuff. The generated map of the foodstuff can also be described in only two dimensions, for instance, length and width, since preferably, the thickness has been established by the first cutting step. The comparison and determination of the second cutting path will be recomputed for the newly generated map of the foodstuff in step 116.

A second cutting step 120 proceeds from the second rescan step 112, map generation 114 and comparison step 116 of FIG. 1, or this step 120 may have been jumped to from a previous step, such as the determination of whether the foodstuff was within tolerance limits in step 110. If the foodstuff has been determined to be within tolerance limits in step 110, a second decision step 124 may follow to decide whether the process jumps to step 116 or step 120. Step 124, may for instance, decide whether the cutting path has been fully described in the previous step 104, in which case, the process may proceed directly to a second cutting step 120. Alternatively, if step 104 only described the first cutting path, then the process would jump to step 116, to calculate the cut path along the second and third axis. In the second cutting step 120, the foodstuff is completed to resemble the desired shape residing within the computer memory.

Referring again to FIG. 2, an embodiment of the foodstuff 200 to be portioned in three dimensions using a method in accordance with the present invention is shown. The conveyor 202 is suited to carry the foodstuff portion 200, such as a chicken breast, through the various steps of the method. Shown is a representative foodstuff portion 200 with the desired shape 215. A step in the method of the present invention will have generated a three-dimensional map of the chicken breast and the computer will have compared the map with the desired shape. The computer will have determined the most correct fit of the desired shape within the generated map. Shown in phantom are the cutting paths for achieving a foodstuff portion in the desired shape. The chicken breast 200 has a first, a second, and a third dimension representing thickness, width, and length, respectively. In a step according to a method of the present invention, the foodstuff portion will be cut along a first path to establish one dimension, such as the thickness, as shown in FIG. 3. It should be noted that the cutting path need not follow a linear path. The first cutting path may be an arcuate or rounded path. It should also be noted that the first cutting path may make two passes. For example, a first pass may cut along the top of the portion and a second pass will cut along the bottom of the portion. This would be desirable if the chicken breast was not lying exactly prone on the conveyor or if the chicken breast had a portion of bone or other undesirable constituent still attached to it.

A further step in a method according to the present invention will cut along a second path to establish a further dimension such as width or length or both as shown in FIG. 4. It should be noted that the second cutting device may also move in a bi-directional manner in the same plane or in two dimensions to establish the second and third dimension. For example, the cutting device may be mounted on a moveable platform, where the cutting device may make two passes along the second dimension to shape the width, and two passes along the third dimension to shape the length. The cutting device in this step can also be the cutting device of a previous step, provided that the cutting device is able to articulate as shown in FIG. 4, moving from the horizontal to the vertical plane. It should also be noted that these paths may not be linear but rather follow a curved or arcuate path as well. The advantage of generating a three-dimensional map is that foodstuff portions may now be cut in three dimensions, whereas previously one dimension was always fixed at the start and the other two were adjusted. This is the big difference between the present invention and the prior art.

FIG. 5 shows steps 112 and 114 of the method of the present invention. Shown is a foodstuff portion 200 which was moved from its original position, defined in phantom, to a new position. It should be noted that the chicken breast now has at least one dimension that is fixed by the first cutting step, therefore, it is only minimally required to generate a cutting path in two dimensions, such as length and width. As before, once a map is generated the map is compared to the desired shape and the best fit is determined. This is done with the aid of a computer having a CPU and a memory. The computer can then send instructions to the appropriate peripheral devices, including cutting devices.

Figure 6:
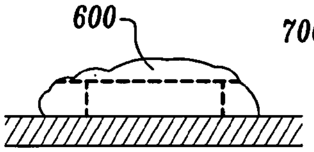
FIG. 6 shows a front elevation view of a product to be portioned using the method of FIG. 1.

An embodiment of a foodstuff to be portioned in three dimensions using a method in accordance with the present invention is shown in FIG. 6. FIG. 6 shows the cutting path along two dimensions, thickness and width.

Figure 7:
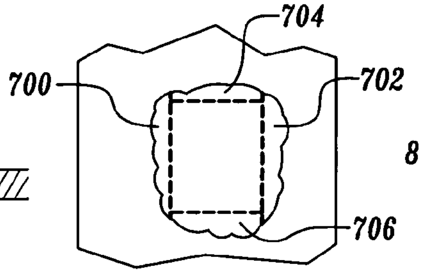
FIG. 7 shows a top plan view of a product to be portioned using the method of FIG. 1.

FIG. 7 shows the same food portion as FIG. 6 showing the length dimension. Using three axis portioning as in the method of the present invention allows for trimming the three dimensions of length, width and thickness. The first cutting step removes region 600 in FIG. 6, while the second cutting step removes regions 700, and 702, followed by regions 704 and 706, or any combination thereof, thus achieving portioning along three axes.

Figure 8:
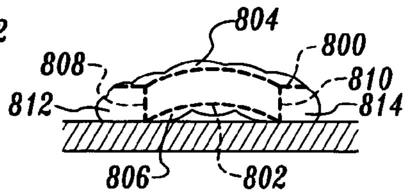
FIG. 8 shows a front elevation view of another product to be portioned using the method of FIG. 1.

Another embodiment of a foodstuff to be portioned in three dimensions using a method in accordance with the present invention is shown in FIG. 8. FIG. 8 shows the cutting path along two dimensions, thickness and width. However, it is to be understood that a third dimension exists and is subject to being portionable as well. First cutting step 108 may cut along line designated by 800 and 802 to remove regions 804 and 806, thus fixing one dimension. The second cutting step may cut along path 808 and 810 to remove regions 812 and 814, thus fixing two dimensions. Also shown is a cutting path following a curved or arcuate path when the foodstuff portion has indentations which would have prevented a constant thickness using conventional methods, the conventional methods only having capability to portion along two axes or two dimensions automatically. Also shown is a cutting path which can be cut by a first and second pass of the foodstuff or a cutting device having dual water jets to portion the top and the bottom simultaneously to arrive at a constant thickness for a desired shape. Alternatively, a rotating and oscillating cutting device may be used to cut the top and the bottom surfaces of the portion.

Figure 9:
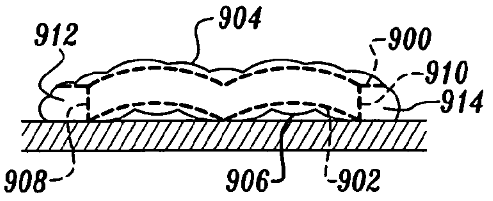
FIG. 9 shows a front elevation view of a further product to be portioned using the method of FIG. 1.

Another embodiment of a foodstuff to be portioned in three dimensions using a method in accordance with the present invention is shown in FIG. 9. FIG. 9 shows the cutting path along two dimensions, thickness and width, for a first and second half of a foodstuff portion. First cutting step 108 can cut along cutting paths 900 and 902 to remove regions 904 and 906, while second cutting step 120 can cut along paths 908 and 910 to remove regions 912 and 914. It should also be understood that there exists a third dimension, length, which can also be trimmed in the second cutting step 120. Also shown is a curved cutting path which may be cut by a first and second pass of a cutting device to cut the top and bottom surfaces of the portions to arrive at a thickness for a desired shape. Alternatively, a rotating and oscillating cutting means may be used to cut the top and the bottom trailing portions.

Figure 10:
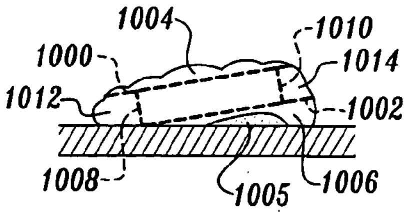
FIG. 10 shows a front elevation view of an additional product to be portioned using the method of FIG. 1.

An embodiment of a foodstuff to be portioned in three dimensions using a method in accordance with the present invention is shown in FIG. 10. FIG. 10 shows the cutting path along two dimensions, thickness and width. First cutting step 108 can cut along cutting paths 1000 and 1002 to remove regions 1004 and 1006, while second cutting step 120 can cut along paths 1008 and 1010 to remove regions 1012 and 1014. It should also be understood that there exists a third dimension, length, which can be trimmed in the second cutting step 120. In the embodiment, a bone fragment 1005 or other undesired constituent may be avoided by skewing or rotating the desired shape within the generated shape to fit the desired shape in the generated shape, thereby avoiding the bone. The resulting cutting path is skewed or angled to avoid the undesired constituent. The cutting path to shape the thickness of the portion can be cut by a first and a second pass of the cutting device to portion the top and the bottom surfaces.

Figure 11:
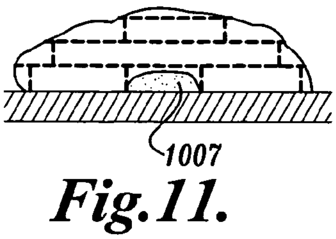
FIG. 11 shows a front elevation view of a plurality of portions to be cut from a foodstuff using the method of FIG. 1.

Another embodiment of a foodstuff to be portioned in three dimensions using a method in accordance with the present invention is shown in FIG. 11. FIG. 11 shows the cutting path along two dimensions, thickness and width. In the embodiment, a foodstuff portion may be cut into a plurality of desired shapes. The shapes may be arranged into one generated map of the foodstuff via the use of a computer, such that the maximum amount of the foodstuff is utilized. Shown are several desired shapes to be cut from one foodstuff portion. Also shown are multiple cutting paths where several cuts are made by multiple passes of the cutting device or multiple heads. A bone fragment 1007 can also be avoided by fitting desired shapes around the bone fragment.

Figure 12:
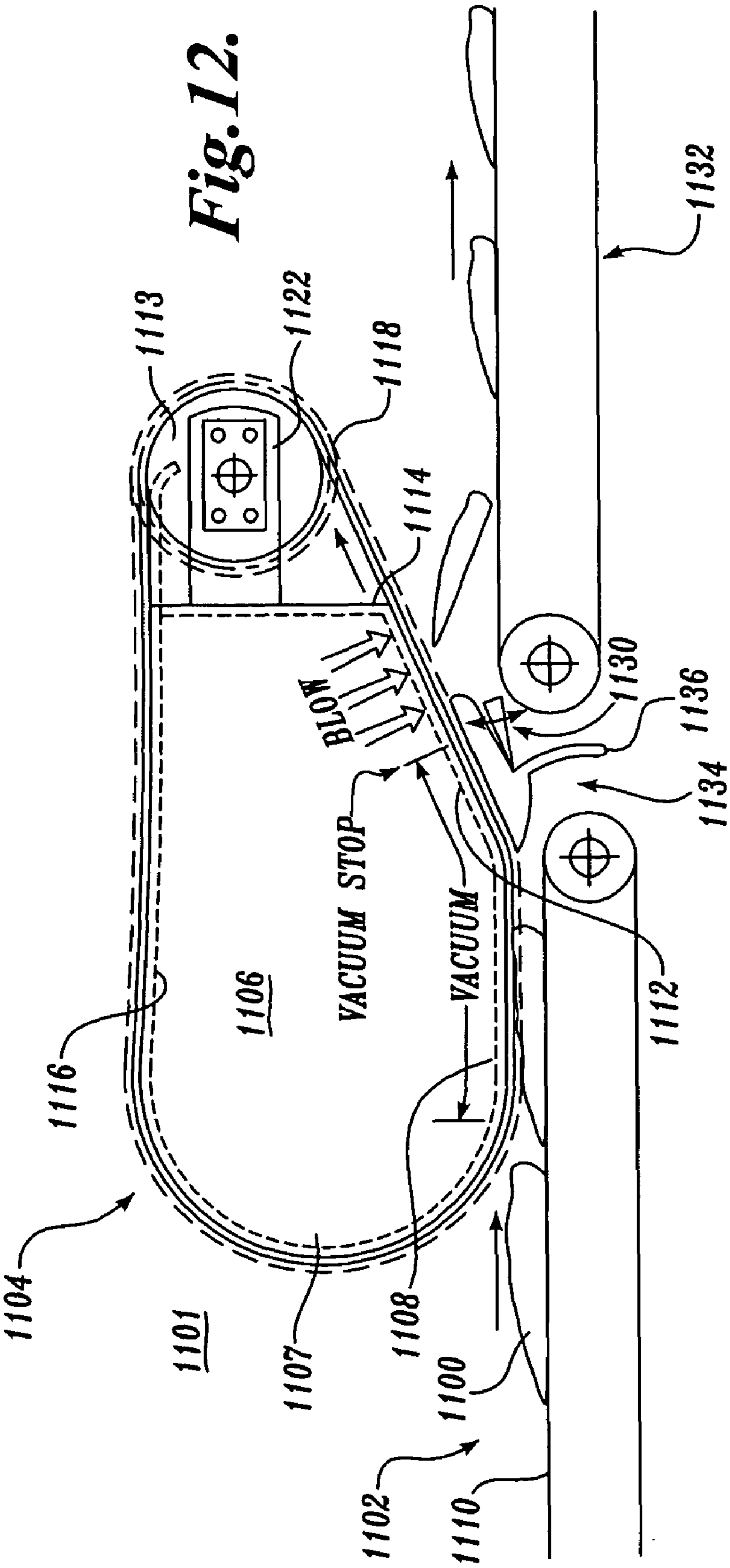
FIG. 12 shows a schematic view of an alternative embodiment of the present invention.

FIG. 12 schematically illustrates how a foodstuff portion 1100 may be cut to a desired thickness in accordance with the present invention. The apparatus 1101 illustrated in FIG. 12 includes a first conveyor system 1102 for delivering foodstuff portions 1100 to the underside of a vacuum chamber 1104. The vacuum chamber is shown as including a housing 1106 in generally oblong shape having a rounded leading end portion 1107 overlying the conveyor 1102 which transitions to a substantially flat bottom section 1108 spaced above the upper rung of the belt 1110 of the conveyor. At approximately the end of the conveyor 1102 the vacuum chamber housing extends diagonally upwardly along section 1112 to a vertical end wall 1114 of the chamber. The top surface 1116 of the chamber housing 1106 is substantially flat. A belt 1118 is trained around the top 1116, left end 1107, flat bottom 1108 and diagonal 1112 sections of the vacuum chamber housing, as well as around a drive pulley 1113 positioned outwardly adjacent the end wall 1114 of the chamber housing. The drive pulley is mounted to the wall 1114 by a bracket 1122. The drive pulley can be driven by numerous methods, for instance by an electric motor, hydraulic motor or otherwise.

A vacuum can be applied to the interior of the chamber housing 1106 by any one of numerous methods. The vacuum chamber preferably is perforated or slotted along its bottom section 1108 and the adjacent portion of the diagonal section 1112. Also, the belt 1118 is preferably perforated so that suction is applied to the adjacent surface of the foodstuff 1100. Thus, foodstuff 1100 carried by conveyor 1102 becomes attached to the belt 1118 and is carried by the belt after the foodstuff portions leave the conveyor 1102, which occurs as the foodstuff portions move along the diagonal portion 1112 of the vacuum chamber. The upper surface of the foodstuff in essence adheres to the belt 1118.

The foodstuff portions 1100, being carried by the belt 1118, are trimmed to thickness by a band knife 1130, spaced beneath the diagonal section 1112 of the vacuum chamber. Rather than a band knife, another type of knife, such as an ultrasonic knife, may be utilized. The distance between the knife 1130 and the adjacent surface of the housing 1106 can be varied to adjust the thickness of the foodstuff portion 1100 as desired.

The perforations in the housing 1106, in communication with a vacuum source, do not exist past the location of the band knife 1130. Instead, pressurized air is directed through perforations in the diagonal section 1112 of a vacuum chamber housing adjacent end wall 1114, thereby to break the suction between the foodstuff portion 1100 and the belt 1118, thereby to drop the trimmed foodstuff portion onto a conveyor 1132, which then can transport the foodstuff portions to another location to be further trimmed and portioned in accordance with the present invention. As shown in FIG. 12, a gap 1134 exists between the adjacent ends of conveyors 1102 and 1132 to allow the trim 1136 from the foodstuff to drop down away from the knife 1130.

One type of foodstuff with respect to which the present invention may be particularly useful is chicken breasts that have skin on one surface of the breasts. Preferably, such chicken breasts are placed on the conveyor 1102 with the skin side up, which is believed to provide a better suction contact with the belt 1110 than if the chicken breasts were positioned skinless side up. However, it is to be understood that other types of foodstuff can be trimmed to thickness using the present invention.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of cutting a three-dimensional portion from a foodstuff, comprising:

(a) using a scanner to scan the foodstuff;

(b) using a computer to perform the steps comprising:

(i) building a three-dimensional map of the foodstuff from the scan and storing the three-dimensional map in the memory of the computer;

(ii) fitting at least one desired shape, which is stored in the memory of the computer, into the three-dimensional map of the foodstuff in the memory of the computer; and (iii) determining one or more cutting paths to be used in portioning the foodstuff so as to produce one or more of the three-dimensional portions of the foodstuff each corresponding to the at least one desired shape; and (c) using a cutter to portion the foodstuff, according to the one or more cutting paths, into the one or more three-dimensional portions of the foodstuff.

2. The method of claim 1, wherein the three-dimensional map includes indentations, contours and discontinuities of the foodstuff.

3. The method of claim 1, wherein the three-dimensional map includes three dimensions corresponding to thickness, width and length of the foodstuff.

4. The method of claim 1, wherein said fitting the at least one desired shape into the three-dimensional map of the foodstuff in the memory of the computer includes adjusting the at least one desired shape relative to the three-dimensional map.

5. The method of claim 4, wherein said adjusting the at least one desired shape is done so as to achieve at least one desired weight for each of the one or more three-dimensional portions of the foodstuff to be produced.

6. The method of claim 5, wherein said adjusting the at least one desired shape entails varying the at least one desired shape along one dimension.

7. The method of claim 5, wherein said adjusting the at least one desired shape entails varying the at least one desired shape along two dimensions that are generally orthogonal to each other.

8. The method of claim 4, wherein said adjusting the at least one desired shape is done so that the at least one desired shape, as adjusted, would avoid defects in the foodstuff.

9. The method of claim 8, wherein said adjusting the at least one desired shape entails varying the at least one desired shape along one dimension.

10. The method of claim 8, wherein said adjusting the at least one desired shape entails varying the at least one desired shape along two dimensions that are generally orthogonal to each other.

11. The method of claim 8, wherein said adjusting the at least one desired shape entails rotating the at least one desired shape relative to the three-dimensional map.

* * * * *